United States Patent Office 3,487,077
Patented Dec. 30, 1969

3,487,077
PROCESS FOR THE PREPARATION OF
21-PHOSPHATE STEROIDS
Norman L. Wendler, Summit, and Harry L. Slates, Florham Park, N.J., assignors to Merck & Co., Inc., Rahway, N.J., a corporation of New Jersey
No Drawing. Continuation of application Ser. No. 453,173, May 4, 1965. This application Feb. 16, 1968, Ser. No. 706,194
Int. Cl. C07c *167/28, 173/00;* C07f *9/08*
U.S. Cl. 260—239.55                         7 Claims

ABSTRACT OF THE DISCLOSURE

The invention disclosed herein relates to and has for its object an improved process for the preparation of 21-phosphate steroids of the substituted pregnane series and alkali metal salts thereof by direct phosphorylation of the corresponding 21-hydroxy steroid using pyrophosphoryl chloride as the phosphorylating agent.

This is a continuation of application Ser. No. 453,173, filed May 4, 1965, now abandoned.

According to the improved process of this invention, the 21-phosphate steroids of the substituted pregnane series are prepared by the phosphorylation of 21-hydroxy steroids of the substituted pregnane series. Any 21-hydroxy steroid of the substituted pregnane series may be phosphorylated according to the process of this invention which does not have an unprotected hydroxyl group on a carbon atom of the ring system or on a side-chain carbon atom, except that a 21-hydroxy steroid with a hydroxyl group in the 11-position may be phosphorylated according to the process of this invention to give a 21-phosphate steroid if a halogen or alkyl group is at the 9-position. Phosphorylation of a 21-hydroxy steroid with an unprotected hydroxyl group on a carbon atom of the ring system usually brings about the removal of a molecule of water and double bond formation if a hydrogen is present on the carbon atom adjacent to the carbon atom on which the hydroxyl is attached. However, a 9-halo or 9-alkyl-11,21-dihydroxy steroid may be phosphorylated to give a 11,21-dihydroxy steroid 21-phosphate according to the process of this invention without the removal of a molecule of water and double bond formation even if hydrogen is present on the 12-position. Hydroxyl groups on a carbon of the ring system may be protected according to any known means such as ester or ether formation to provide alkoxy, aralkoxy, benzoxy or substituted benzoxy groups and acyloxy, benzoyloxy or substituted benzoyloxy groups, and two adjacent hydroxyl groups may be protected by acetal or ketal formation.

Some 21-phosphate steroids of the substituted pregnane series which may be prepared by the process of this invention, have structural Formulas A, B, and C.

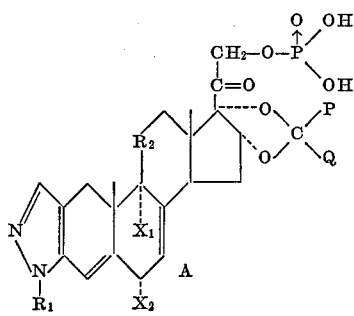

A

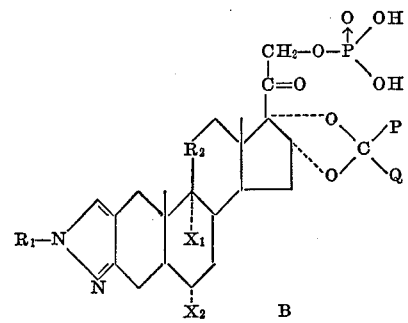

B wherein $R_1$ is hydrogen, acyl, alkyl, aralkyl, cycloalkyl, aryl, a heterocyclic nucleus, or substituted derivatives thereof, $R_2$ is methylene, hydroxy methylene or carbonyl, $X_1$ is hydrogen, halogen or lower alkyl, but when $R_2$ is hydroxyl, $X_1$ is halogen or lower alkyl, $X_2$ is hydrogen, methyl, fluoro or chloro, P and Q are each hydrogen, alkyl, halo-lower alkyl, monocyclic cycloalkyl, monocyclic aryl, monocyclic aryl lower alkyl, monocyclic heterocyclic or monocyclic heterocyclic lower alkyl; or together with the carbon atom to which they are joined, P and Q are cycloalkyl or monocyclic heterocyclic:

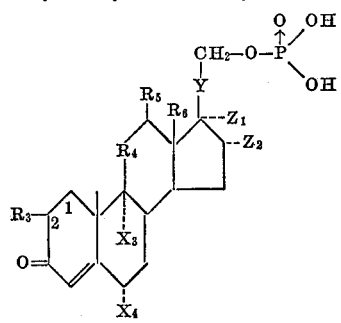

wherein the 1,2-position is saturated or double-bonded, $R_3$ is hydrogen or methyl, $R_4$ is methylene, hydroxymethylene, or carbonyl, $R_5$ is hydrogen or lower alkyl, $R_6$ is lower alkyl, $X_3$ is hydrogen, halogen or lower alkyl, and when $X_3$ is hydrogen $R_4$ is methylene or carbonyl, $X_4$ is hydrogen, lower alkyl, or halogen, preferably fluoro, Y is methylene, carbonyl or thiocarbonyl, $Z_1$ is hydrogen or acyloxy, $Z_2$ is hydrogen, halogen, trifluoromethyl or lower alkyl, or wherein $Z_1$ and $Z_2$ are together

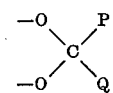

in which P and Q have the same significance as in structural Formulas A and B.

In all of the compounds of the A, B, and C structural formulas, a double bond may be present at the $\Delta^6$ position.

The 21-phosphate steroids of the substituted pregnane series having structural Formulas A, B and C are prepared by direct phosphorylation of the corresponding 21-hydroxy steroids of the substituted pregnane series with pyrophosphoryl chloride.

In the direct phosphorylation an excess of pyrophosphoryl chloride is used which acts as a solvent for the 21-hydroxy steroid which is to be phosphorylated. The solution of 21-hydroxy steroid in pyrophosphoryl chloride is protected from moisture and stirred at a temperature from about −40° C. to about 20° C. until all the 21-hydroxy steroid is in solution and for a short time thereafter during which the temperature of the reaction mixture is maintained within the same range. The reaction mixture is then slowly added to an amount of vigorously stirred water sufficient to decompose all the excess pyrophosphoryl chloride and convert the intermediate 21-dichlorophosphate steroid to 21-dihydrogen phosphate steroid and stirred for a short time after addition is complete to make certain all excess pyrophosphoryl chloride is decomposed and the 21-dichlorophosphate steroid is converted to the 21-dihydrogen phosphate steroid. If the 21-dihydrogen phosphate steroid is negligibly soluble in water, the precipitate of 21-dihydrogen phosphate steroid, which is formed upon addition of the reaction mixture to water, is removed by filtration, and dried under reduced pressure. However, if the 21-dihydrogen phosphate steroid is appreciably soluble in water, it may be isolated by extraction with a suitable solvent, such as chloroform or ether, or by ion exchange chromatography.

Both mono- and di-alkali metal salts of the 21-phosphate steroids of structural Formulas A, B and C may be obtained by treatment of such compounds with an alkali metal compound, e.g., an alkali metal hydroxide, such as sodium hydroxide, potassium hydroxide, or the like, or with an alkali metal carbonate such as sodium carbonate, potassium carbonate, or the like.

The 21-phosphate steroids of the substituted pregnane series having structural Formulas A, B and C and alkali metal salts thereof have extremely high anti-inflammatory activity and are particularly suitable for use in preparing aqueous solutions and formulations for topical, intravenous and intramuscular application because of their high order of solubility in water.

Among the suitable starting 21-hydroxy steroids of the substituted pregnane series utilizable for the production of the compounds of the structural Formulas A, B and C in the process of this invention may be mentioned:

16α,17α-(butylidene)-6-fluorotriamcinolone,
16α,17α-(3'-pentylidene)-6α-fluorotriamcinolone,
16α,17α-cyclohexylidene-6α-fluorotriamcinolone,
16α,17α-isopropylidene-6α-fluoro-9α-methyl-16α-hydroxyprednisolone,
16α,17α-isopropylidene-6α,9α-difluoro-16α-hydroxyhydrocortisone,
16α,17α-isopropylidene-6α,9α-difluoro-16α-hydroxyprednisolone,
16α,17α-chloroisopropylidene-6α,9α-difluoro-16α-hydroxyprednisolone,
16α,17α-isopropylidene-6α-fluorotriamcinolone,
16α,17α-isopropylidene-6α,9α-difluoro-12α-methyl-16α-hydroxyhydrocortisone,
9α-fluoro-11β,16α,17α,21-tetrahydroxy-20-oxo-4-pregneno-[3,2-c]pyrazole-16α,17α-acetonide,
9α-fluoro-11β,16α,17α,21-tetrahydroxy-20-oxo-2'-phenyl-4-pregneno-[3,2-c]pyrazole-16α,17α-acetonide,
9α-fluoro-11β,16α,21-tetrahydroxy-20-oxo-2'-(p-fluorophenyl)-4-pregneno-[3,2-c]pyrazole-16α,17α-acetonide,
6α,9α-difluoro-11β,16α,17α,21-tetrahydroxy-20-oxo-4-pregneno-[3,2-c]pyrazole-16α,17α-acetonide,
6α,9α-difluoro-11β,16α,17α,21-tetrahydroxy-20-oxo-2'-phenyl-4-pregneno-[3,2-c]pyrazole-16α,17α-acetonide,
6α,9α-difluoro-11β,16α,17α,21-tetrahydroxy-20-oxo-2'-(p-fluorophenyl)-4-pregneno-[3,2-c]pyrazole-16α,17α-acetonide,
9α-fluoro-11β,16α,17α,21-tetrahydroxy-6α-methyl-20-oxo-4-pregneno-[3,2-c]pyrazole-16α,17α-acetonide,
9α-fluoro-11β,16α,17α,21-tetrahydroxy-6α-methyl-20-oxo-2'-phenyl-4-pregneno-[3,2-c]pyrazole-16α,17α-acetonide,
9α-fluoro-11β,16α,17α,21-tetrahydroxy-6α-methyl-20-oxo-2'-(p-fluorophenyl)-4-pregneno-[3,2-c]pyrazole-16α,17α-acetonide,
6,9α-difluoro-11β,16α,17α,21-tetrahydroxy-20-oxo-4,6-pregnadiene-[3,2-c]pyrazole-16α,17α-acetonide,
6,9α-difluoro-11β,16α,17α,21-tetrahydroxy-20-oxo-2'-phenyl-4,6-pregnadieno-[3,2-c]pyrazole-16α,17α-acetonide,
6,9α-difluoro-11β,16α,17α,21-tetrahydroxy-20-oxo-2'-(p-fluorophenyl)-4,6-pregnadieno-[3,2-c]pyrazole-16α,17α-acetonide,
9α-fluoro-11β,16α,17α,21-tetrahydroxy-6-methyl-20-oxo-4,6-pregnadieno-[3,2-c]pyrazole-16α,17α-acetonide,
9α-fluoro-11β,16α,17α,21-tetrahydroxy-6-methyl-20-oxo-2'phenyl-4,6-pregnadieno-[3,2-c]pyrazole-16α,17α-acetonide,
9α-fluoro-11β,16α,17α,21-tetrahydroxy-6-methyl-20-oxo-2'-(p-fluorophenyl)-4,6-pregnadieno-[3,2-c]pyrazole-16α,17α-acetonide,
9α-fluoro-11β,16α,17α,21-tetrahydroxy-20-oxo-2'-phenyl-pregnadieno-[3,2-c]pyrazole-16α,17α-acetonide,
9α-fluoro-11β,16α,17α,21-tetrahydroxy-20-oxo-2'-phenyl-4,6-pregnadieno-[3,2-c]pyrazole-16α,17α-acetonide,
9α-fluoro-11β,16α,17α,21-tetrahydroxy-20-oxo-2'-(p-fluorophenyl)-4,6-pregnadieno-[3,2-c]pyrazole-16α,17α-acetonide,
6-fluoro-16α,17α,21-trihydroxy-20-oxo-4,6-pregnadieno-[3,2-c]pyrazole-16α,17α-acetonide,
6-fluoro-16α,17α,21-trihydroxy-20-oxo-2'-phenyl-4,6-pregnadieno-[3,2-c]pyrazole-16α,17α-acetonide,
6-fluoro-16α,17α,21-trihydroxy-20-oxo-2'-(p-fluorophenyl)-4,6-pregnadieno-[3,2-c]pyrazole-16,17α-acetonide,
16α,17α,21-trihydroxy-6-methyl-20-oxo-4,6-pregnadieno-[3,2-c]pyrazole-16α,17α-acetonide,
16α,17α,21-trihydroxy-6-methyl-20-oxo-2'-phenyl-4,6-pregnadieno-[3,2-c]pyrazole-16α,17α-acetonide,
16α,17α,21-trihydroxy-6-methyl-20-oxo-2'-(p-fluorophenyl)-4,6-pregnadieno-[3,2-c]pyrazole-16α,17α-acetonide,
16α,17α,21-trihydroxy-20-oxo-4,6-pregnadieno-[3,2-c]pyrazole-16α,17α-acetonide,
16α,17α,21-trihydroxy-20-oxo-2'-phenyl-4,6-pregnadieno-[3,2-c]pyrazole-16α,17α-acetonide,
16α,17α,21-trihydroxy-20-oxo-2'-(p-fluorophenyl)-4,6-pregnadieno-[3,2-c]pyrazole-16α,17α-acetonide,
16α,17α,21-trihydroxy-20-oxo-4-pregneno-[3,2-c]pyrazole-16α,17α-acetonide,
16α,17α,21-trihydroxy-20-oxo-2'-phenyl-4-pregneno-[3,2-c]pyrazole-16α,17α-acetonide,
16α,17α,21-trihydroxy-20-oxo-2'-(p-fluorophenyl)-4-pregneno-[3,2-c]pyrazole-16α,17α-acetonide,
16α,17α,21-trihydroxy-6α-methyl-20-oxo-2'-phenyl-4-pregneno-[3,2-c]pyrazole-16α,17α-acetonide,
16α,17α,21-trihydroxy-6α-methyl-20-oxo-2'-(p-fluorophenyl)-4-pregneno-[3,2-c]pyrazole-16α,17α-acetonide,
16α,17α,21-trihydroxy-6α-methyl-20-oxo-4-pregneno-[3,2-c]pyrazole-16α,17α-acetonide,
6-fluoro-16α,17α,21-trihydroxy-11,20-dioxo-4,6-pregnadieno-[3,2-c]pyrazole-16α,17α-acetonide,
6-fluoro-16α,17α,21-trihydroxy-11,20-dioxo-2'-phenyl-4,6-pregnadieno-[3,2-c]pyrazole-16α,17α-acetonide,
6-fluoro-16α,17α,21-trihydroxy-11,20-dioxo-2'-(p-fluorophenyl)-4,6-pregnadieno-[3,2-c]pyrazole-16α,17α-acetonide,
16α,17α,21-trihydroxy-6-methyl-11,20-dioxo-4,6-pregnadieno-[3,2-c]pyrazole-16α,17α-acetonide,
16α,17α,21-trihydroxy-6-methyl-11,20-dioxo-2'-phenyl-4,6-pregnadieno-[3,2-c]pyrazole-16α,17α-acetonide,
16α,17α,21-trihydroxy-6-methyl-11,20-dioxo-2'-(p-fluorophenyl)-4,6-pregnadieno-[3,2-c]pyrazole-16α,17α-acetonide,
16α,17α,21-trihydroxy-11,20-dioxo-4,6-pregnadieno[3,2-c]pyrazole-16α,17α-acetonide,
16α,17α,21-trihydroxy-11,20-dioxo-2' phenyl-4,6-pregnadieno-[3,2-c]pyrazole-16α,17α-acetonide,
16α,17α,21-trihydroxy-11,20-dioxo-2'-(p-fluorophenyl)-4,6-pregnadieno-[3,2-c]pyrazole-16α,17α-acetonide,
16α,17α,21-trihydroxy-11,20-dioxo-4-pregneno-[3,2-c]pyrazole-16α,17α-acetonide,
16α,17α,21-trihydroxy-11,20-dioxo-2'-phenyl-4-pregneno-[3,2-c]pyrazole-16α,17α-acetonide,
16α,17α,21-trihydroxy-11,20-dioxo-2'-(p-fluorophenyl)-

4-pregnano-[3,2-c]pyrazole-16α,17α-acetonide,
16α,17α21-trihydroxy-6-methyl-11,20-dioxo-2′-phenyl-
  4-pregneno-[3,2-c]pyrazole-16α,17α-acetonide,
16α,17α,21-trihydroxy-6α-methyl-11,20-dioxo-2′-
  (p-fluorophenyl)-4-pregneno-[3,2-c]pyrazole-16α,17α-
  acetonide,
16α,17α,21-trihydroxy-6α-methyl-11,20-dioxo-4-pregneno-
  [3,2-c]pyrazole-16α,17α--acetonide.

The following examples illustrate methods of carrying out the present invention, but it is to be understood that these examples are given for purposes of illustration and not of limitation.

EXAMPLE 1

Preparation of 16α-17α-(2′-butylidene)-6α-fluorotriamcinalone 21-phosphate and potassium salt 0.5 g. of 16α-17α-(2′-butylidene)-6α-fluorotriamcinalone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml. portions of chloroform. The chloroform extracts are combined and the chloroform is removed by distillation under reduced pressure. The residue is 16α,17α-(2′-butylidene)-6α-fluorotriamcinalone 21-phosphate in substantially pure form.

The 16α-17α-(2′-butylidene)-6α-fluorotriamcinalone 21-phosphate is dissolved in 50 ml. of water containing two molecular equivalents of potassium hydroxide. The solution is then lyophilized. The resulting white powder is substantially pure dipotassium salt of 16α17α-(2′-butylidene)-6α-fluoro-triamcinalone 21-phosphate.

EXAMPLE 2

Preparation of 16α,17α-(3′-pentylidene)-6α-fluoro-triamcinalone 21-phosphate and potassium salt 0.5 g. of 16α,17α - (3′ - pentylidene)-6α-fluoro-triamcinalone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml. portions of choloform. The chloroform extracts are combined and the chloroform is removed by distillation under reduced pressure. The residue is 16α,17α-(3′-pentylidene) - 6α - fluoro-triamcinalone 21-phosphate in substantially pure form.

The 16α - 17α-(3′-pentylidene)-6α-fluoro-triamcinalone 21-phosphate is dissolved in 50 ml. of water containing two molecular equivalents of potassium hydroxide. The solution is then lyophilized. The resulting white powder is substantially pure dipotassium salt of 16α-17α-(3′-pentylidene)-6α-fluoro-triamcinalone 21 phosphate.

EXAMPLE 3

Preparation of 16α,17α-cyclohexylidene-6α-fluoro-triamcinalone 21-phosphate and potassium salt 0.5 g. of 16α,17α-cyclohexylidene-6α-fluoro-triamcinalone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml. portions of chloroform. The chloroform extracts are combined and the chloroform is removed by distillation under reduced pressure. The residue is 16α,17α-cyclohexylidene-6α-fluoro-triamcinalone 21-phosphate in substantially pure form.

The 16α,17α - cyclohexylidene-6α-fluoro-triamcinalone 21-phosphate is dissolved in 50 ml. of water containing two molecular equivalents of potassium hydroxide. The solution is then lyophilized. The resulting white powder is substantially pure dipotassium salt of 16α-17α-cyclohexylidene-6α-fluoro-triamcinalone 21-phosphate.

EXAMPLE 4

Preparation of 16α,17α-isopropylidene-6α-fluoro-9α-methyl-16α-hydroxyprednisolone 21-phosphate and potassium salt 0.5 g. of 16α,17α-isopropylidene-6α-fluoro-9α-methyl-16α-hydroxyprednisolone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml. portions of chloroform. The chloroform extracts are combined and the chloroform is removed by distillation under reduced pressure. The residue is 16α,17α-isopropylidene-6α-fluoro-9α-methyl - 16α - hydroxyprednisolone 21-phosphate in substantially pure form.

The 16α,17α - isopropylidene-6α-fluoro-9α-methyl-16α-hydroxyprednisolone 21-phosphate is dissolved in 50 ml. of water containing two molecular equivalents of potassium hydroxide. The solution is then lyophilized. The resulting white powder is substantially pure dipotassium salt of 16α,17α - isopropylidene-6α-fluoro-9α-methyl-16α-hydroxyprednisolone 21-phosphate.

EXAMPLE 5

Preparation of 16α,17α-isopropylidene-6α,9α-difluoro-16α-hydroxyhydrocortisone 21-phosphate and potassium salt 0.5 g. of 16α,17α-isopropylidene-6α,9α-difluoro-16α-hydroxyhydrocortisone is added with stirring to 3.0 ml. of pyrophosphoryl chloride which is protected from moisture and maintained at 0° C. during addition and for twenty minutes after addition is complete. The reaction mixture is then clear solution and is slowly added to 100 ml. of vigorously stirred water which is at a temperature of 0° C. The temperature of the mixture is allowed to come to room temperature and extracted three times with 100 ml. portions of chloroform. The chloroform extracts are combined and the chloroform is removed by distillation under reduced pressure. The residue is 16α,17α-isopropylidene-6α,9α-difluoro-16α-hydroxyhydrocortisone 21-phosphate in substantially pure form.

The 16α,17α-isopropylidene - 6α,9α - difluoro-16α-hydroxyhydrocortisone 21-phosphate is dissolved in 50 ml. of water containing two molecular equivalents of potassium hydroxide. The solution is then lyophilized. The resulting white powder is substantially pure dipotassium salt of 16α,17α-isopropylidene - 6α,9α - difluoro-16α-hydroxyhydrocortisone 21-phosphate.

EXAMPLE 6

Preparation of 16α,17α-isopropylidene-6α,9α-difluoro-16α-hydroprednisolone 21-phosphate and potassium salt 0.5 g. of 16α,17α-isopropylidene-6α,9α-difluoro-16α-hydroprednisolone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml.

portions of chloroform. The chloroform extracts are combined and the chloroform is removed by distillation under pressure. The residue is 16α,17α-isopropylidene-6α,9α-difluoro-16α-hydroprednisolone 21-phosphate in substantially pure form.

The 16α,17α-isopropylidene-6α,9α-difluoro-16α-hydroprednisolone 21-phosphate is dissolved in 50 ml. of water containing two molecular equivalents of potassium hydroxide. The solution is then lyophilized. The resulting white powder is substantially pure dipotassium salt of 16α,17α-isopropylidene - 6α,9α - difluoro-16α-hydroprednisolone 21-phosphate.

EXAMPLE 7

Preparation of 16α,17α-chloro-isopropylidene-6α,9α-difluoro - 16α - hydroxyprednisolone 21-phosphate and potassium salt 0.5 g. of 16α,17α-chloro-isopropylidene-6α,9α-difluoro-16α-hydroxyprednisolone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml. portions of chloroform. The chloroform extracts are combined and the chloroform is removed by distillation under reduced pressure. The reisdue is 16α,17α-chloro-isopropylidene-6α,9α-difluoro - 16α - hydroxyprednisolone 21-phosphate in substantially pure form.

The 16α,17α-chloro-isopropylidene-6α,9α-difluoro-16α-hydroxyprednisolone 21-phosphate is dissolved in 50 ml. of water containing two molecular equivalents of potassium hydroxide. The solution is then lyophilized. The resulting white powder is substantially pure dipotassium salt of 16α,17α - chloro-isopropylidene-6α,9α-difluoro-16α-hydroxyprednisolone 21-phosphate.

EXAMPLE 8

Preparation of 16α,17α - isopropylidene - 6α - fluorotriamcinolone 21-phosphate and potassium salt 0.5 g. of 16α,17α-isopropylidene-6α-fluorotriamcinolone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml. portions of chloroform. The chloroform extracts are combined and the chloroform is removed by distillation under reduced pressure. The residue is 16α,17α-isopropylidene-6α-fluorotriamcinolone 21-phosphate in substantially pure form.

The 16α,17α-isopropylidene-6α-fluoro-triamcinolone 21-phosphate is dissolved in 50 ml. of water containing two molecular equivalents of potassium hydroxide. The solution is then lyophilized. The resulting white powder is substantially pure dipotassium salt of 16α,17α-isopropylidene-6α-fluorotriamcinolone 21-phosphate.

EXAMPLE 9

Preparation of 16α,17α - isopropylidene-6α,9α-difluoro-12α-methyl-16α-hydroxyhydrocortisone 21 - phosphate and potassium salt 0.5 g. of 16α,17α-isopropylidene-6α,9α-difluoro-12α-methyl-16α-hydroxyhydrocortisone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml. portions of chloroform. The chloroform extracts are combined and the chloroform is removed by distillation under reduced pressure. The residue is 16α,17α-isopropylidene-6α,9α-difluoro-12α-methyl - 16α-hydroxyhydrocortisone 21-phosphate in substantially pure form.

The 16α,17α-isopropylidene-6α,9α-difluoro-12α-methyl-16α-hydroxyhydrocortisone 21-phosphate is dissolved in 50 ml. of water containing two molecular equivalents of potassium hydroxide. The solution is then lyophilized. The resulting white powder is substantially pure dipotassium salt of 16α,17α-isopropylidene-6α,9α-difluoro - 12α-methyl-16α-hydroxyhydrocortisone 21-phosphate.

EXAMPLE 10

Preparation of 9α - fluoro-11β,16α,17α,21 - tetrahydroxy-20-oxo-4-pregneno-[3,2-c]pyrazole-16α,17α - acetonide 21-phosphate and sodium salt 0.5 g. of 9α-fluoro-11β,16α,17α,21 - tetrahydroxy-20-oxo-4-pregneno-[3,2-c]pyrazole - 16α,17α - acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 9α-fluoro-11β,16α,17α, 21-tetrahydroxy-20-oxo-4-pregneno-[3,2-c]pyrazole - 16α,17α - acetonide 21-phosphate is removed by filtration and dried under reduced pressure at 100° C.

The 9α-fluoro - 11β,16α,17α,21-tetrahydroxy-20-oxo-4-pregneno-[3,2-c]pyrazole-16α,17α-acetonide 21-phosphate is dissolved in 50 ml. of water containing one molar equivalent of sodium carbonate. The solution is then lyophilized. The resulting white powder is substantially pure disodium salt of 9α-fluoro - 11β,16α,17α,21-tetrahydroxy - 20 - oxo-4-pregneno - [3,2-c]pyrazole-16α,17α-acetonide 21-phosphate.

EXAMPLE 11

Preparation of 6α,9α - difluoro-11β,16α,17α,21-tetrahydroxy-20-oxo - 2' - (p-fluorophenyl) - 4 - pregneno-[3,2-c]pyrazole-16α,17α-acetonide 21 - phosphate and sodium salt 0.5 g. of 6α,9α-difluoro-11β,16α,17α,21 - tetrahydroxy-20 - oxo - 2' - (p-fluorophenyl)-4-pregneno-[3,2-c]pyrazole-16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 6α,9α-difluoro-11β,16α,17α,21-tetrahydroxy - 20 - oxo - 2' - (p-fluorophenyl) - 4 - pregneno - [3,2-c]pyrazole-16α,17α-acetonide 21-phosphate is removed by filtration and dried under reduced pressure at 100° C.

The 6α,9α-difluoro-11β,16α,17α,21 - tetrahydroxy - 20-oxo - 2' - (p-fluorophenyl) - 4 - pregneno-[3,2-c]pyrazole - 16α,17α - acetonide 21 - phosphate is dissolved in 50 ml. of water containing one molar equivalent of sodium carbonate. The solution is then lyophilized. The resulting white powder is substantially pure disodium salt of 6α,9α-difluoro-11β,16α,17α,21-tetrahydroxy - 20-oxo - 2'(p-fluorophenyl) - 4 - pregneno-[3,2-c]pyrazole-16α,17α-acetonide 21-phosphate.

EXAMPLE 12

9α - fluoro - 11β,16α,17α,21 - tetrahydroxy - 6α - methyl-20 - oxo - 4 - pregneno - [3,2 - c]pyrazole - 16α,17α-acetonide 21-phosphate and sodium salt 0.5 g. of 9α-fluoro-11β,16α,17α,21-tetrahydroxy-6α-methyl - 20 - oxo - 4 - pregneno - [3,2 - c]pyrazole - 16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 9α-fluoro-11β,16α,17α,21-tetrahydroxy - 6α - methyl - 20 - oxo - 4 - pregneno - [3,2-c]pyrazole-16α,17α-acetonide 21-phosphate is removed by filtration and dried under reduced pressure at 100° C.

The 9α - fluoro - 11β,16α,17α,21 - tetrahydroxy - 6α-methyl - 20 - oxo - 4 - pregneno - [3,2 - c]pyrazole - 16α,17α-acetonide 21-phosphate is dissolved in 50 ml. of water containing one molar equivalent of sodium carbonate. The solution is then lyophilized. The resulting white powder is substantially pure disodium salt of 9α-fluoro-11β,16α,17α,21 - tetrahydroxy - 6α - methyl - 20 - oxo - 4 - pregneno[3,2-c]pyrazole-16α,17α-acetonide 21-phosphate.

EXAMPLE 13

Preparation of 6-fluoro-16α,17α,21-trihydroxy-20-oxo-2'-(p - fluorophenyl) - 4,6 - pregnadieno - [3,2 - c]pyrazole-16α,17α-acetonide 21-phosphate and sodium salt 0.5 g. of 6-fluoro-16α,17α,21-trihydroxy-20-oxo-2'-(p-fluorophenyl) - 4,6 - pregnadieno - [3,2 - c]pyrazole - 16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 6-fluoro-16α,17α,21-trihydroxy-20-oxo - 2' - (p - fluorophenyl) - 4,6 - pregnadieno - [3,2-c]pyrazole-16α,17α-acetonide 21-phosphate is removed by filtration and dried under reduced pressure at 100° C.

The 6 - fluoro - 16α,17α,21 - trihydroxy - 20 - oxo - (p-fluorophenyl) - 4,6 - pregnadieno - [3,2 - c]pyrazole - 16α, 17α-acetonide 21-phosphate is dissolved in 50 ml. of water containing one molar equivalent of sodium carbonate. The solution is then lyophilized. The resulting white powder is substantially pure disodium salt of 6-fluoro-16α,17α,21-trihydroxy - 20 - oxo(p - fluorophenyl) - 4,6 - pregnadieno - [3,2 - c]pyrazole - 16α,17α - acetonide 21-phosphate.

EXAMPLE 14

Preparation of 16α,17α,21-trihydroxy-6-methyl-20-oxo-4,6 - pregnadieno - [3,2 - c]pyrazole - 16α, 17α - acetonide 21-phosphate and sodium salt 0.5 g. of 16α,17α,21-trihydroxy-6-methyl-20-oxo-4,6-pregnadieno - [3,2 - c]pyrazole - 16α,17α - acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 16α,17α,21-trihydroxy-6-methyl-20-oxo - 4,6 - pregnadieno - [3,2 - c]pyrazole - 16α,17α - acetonide 21-phosphate is removed by filtration and dried under reduced pressure at 100° C.

The 16α,17α,21 - trihydroxy - 6 - methyl - 20 - oxo-4,6 - pregnadieno - [3,2 - c]pyrazole - 16α,17α - acetonide 21-phosphate is dissolved in 50 ml. of water containing one molar equivalent of sodium carbonate. The solution is then lyophilized. The resulting white powder is substantially pure disodium salt of 16α,17α,21-trihydroxy-6-methyl - 20 - oxo - 4,6 - pregnadieno - [3,2 - c]pyrazole-16α,17α-acetonide 21-phosphate.

EXAMPLE 15

Preparation of 16α,17α,21-trihydroxy-20-oxo-4,6-pregnadieno - [3,2 - c]pyrazole - 16α,17α - acetonide 21-phosphate and sodium salt 0.5 g. of 16α,17α,21-trihydroxy-20-oxo-4,6-pregnadieno-[3,2-c]pyrazole-16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 16α,17α, 21 - trihydroxy - 20 - oxo - 4,6 - pregnadieno - [3,2 - c]pyrazole-16α,17α-acetonide 21-phosphate is removed by filtration and dried under reduced pressure at 100° C.

The 16α,17α,21 - trihydroxy - 20 - oxo - 4,6 - pregnadieno - [3,2 - c]pyrazole - 16α,17α - acetonide 21-phosphate is dissolved in 50 ml. of water containing one molar equivalent of sodium carbonate. The solution is then lyophilized. The resulting white powder is substantially pure disodium salt of 16α,17α,21-trihydroxy-20-oxo-4,6-pregnadieno - [3,2 - c]pyrazole - 16α,17α - acetonide 21-phosphate.

EXAMPLE 16

Preparation of 16α,17α,21-trihydroxy-20-oxo-2'-(p-fluorophenyl) - 4,6 - pregnadieno - [3,2-c]pyrazole-16α,17α-acetonide 21-phosphate and sodium salt 0.5 g. of 16α,17α,21-trihydroxy - 20 - oxo-2'-(p-fluorophenyl) - 4,6 - pregnadieno-[3,2-c]pyrazole-16α,17α-acetonide is added with stirring to 3.0 ml. of pyrophosphonrl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 16α,17α,21-trihydroxy-20-oxo-2'-(p-fluorophenyl) - 4,6 - pregnadieno-[3,2-c]pyrazole-16α, 17α-acetonide 21-phosphate is removed by filtration and dried under reduced pressure at 100° C.

The 16α,17α,21-trihydroxy-20-oxo-2'-(p-fluorophenyl)-4,6-pregnadieno-[3,2-c]pyrazole - 16α,17α - acetonide 21-phosphate is dissolved in 50 ml. of water containing one molar equivalent of sodium carbonate. The solution is then lyophilized. The resulting while powder is substantially pure disodium salt of 16α,17α,21-trihydroxy-20-oxo-2'-(p-fluorophenyl) - 4,6 - pregnadieno - [3,2-c]pyrazole-16α,17α-acetonide 21-phosphate.

EXAMPLE 17

Preparation of 16α,17α,21-trihydroxy-20-oxo-4-pregneno-[3,2-c]pyrazole - 16α,17α - acetonide 21-phosphate and sodium salt 0.5 g. of 16α,17α,21-trihydroxy - 20 - oxo-4-pregneno-[3,2-c]pyrazole-16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 16α,17α,21-trihydroxy - 20 - oxo-4-pregneno - [3,2-c]pyrazole-16α,17α-acetonide 21-phosphate is removed by filtration and dried under reduced pressure at 100° C.

The 16α,17α,21-trihydroxy-20-oxo-4-pregneno - [3,2-c] pyrazole-16α,17α-acetonide 21-phosphate is dissolved in 50 ml. of water containing one molar equivalent of sodium carbonate. The solution is then lyophilized. The resulting white powder is substantially pure disodium salt of 16α,17α,21-trihydroxy - 20 - oxo-4-pregneno-[3,2-c]pyrazole-16α,17α-acetonide 21-phosphate.

EXAMPLE 18

Preparation of 16α,17α,21-trihydroxy-6α-methyl-2-oxo-4-pregneno-[3,2-c]pyrazole - 16α,17α - acetonide 21-phosphate and sodium salt 0.5 g. of 16α,17α,21-trihydroxy-6α-methyl-2-oxo-4-pregneno-[3,2-c]pyrazole-16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 16α,17α,21-trihydroxy-6α-methyl-2-oxo-4-pregneno - [3,2-c]pyrazole-16α,17α-acetonide 21-phosphate is removed by filtration and dried under reduced pressure at 100° C.

The 16α,17α,21-trihydroxy - 6α - methyl-2-oxo-4-pregneno-[3,2-c]pyrazole - 16α,17α - acetonide 21-phosphate is dissolved in 50 ml. of water containing one molar equivalent of sodium carbonate. The solution is then lyophilized. The resulting white powder is substantially pure disodium salt of 16α,17α,21 - trihydroxy - 6α - methyl-2-oxo-4-pregneno-[3,2-c]pyrazole-16α,17α-acetonide 21-phosphate.

EXAMPLE 19

Preparation of 6,9α-difluoro-11β,16α,17α,21-tetrahydroxy-20-oxo - 4,6 - pregnadieno-[3,2-c]pyrazole-16α,17α-acetonide 21-phosphate and sodium salt 0.5 g. of 6,9α-difluoro-11β,16α,17α,21-tetrahydroxy-20-oxo-4,6-pregnadieno-[3,2-c]pyrazole-16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 6,9α-difluoro-11β,16α,17α,21-tetrahydroxy-20-oxo-4,6-pregnadieno-[3,2-c]pyrazole - 16α,17α - acetonide 21-phosphate is removed by filtration and dried under reduced pressure at 100° C.

The 6,9α-difluoro-11β,16α,17α,21-tetrahydroxy-20-oxo-4,6-pregnadieno-[3,2-c]pyrazole - 16α,17α - acetonide 21-phosphate is dissolved in 50 ml. of water containing one molar equivalent of sodium carbonate. The solution is then lyophilized. The resulting white powder is substantially pure disodium salt of 6,9α-difluoro-11β,16α,17α,21-tetrahydroxy-20-oxo - 4,6 - pregnadieno-[3,2-c]pyrazole - 16α,17α-acetonide 21-phosphate.

EXAMPLE 20

Preparation of 9α-fluoro-11β,16α,17α,21-tetrahydroxy-6-methyl-20-oxo-4,6-pregnadieno-[3,2 - c]pyrazole - 16α,17α-acetonide 21-phosphate and sodium salt 0.5 g. of 9α-fluoro - 11β,16α,17α,21 - tetrahydoxy - 6-methyl-20-oxo-4,6-pregnadieno-[3,2-c]pyrazole - 16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 9α-fluoro-11β,16α,17α,21-tetrahydroxy-6-methyl-20-oxo-4,6-pregnadieno - [3,2-c]pyrazole-16α,17α-acetonide 21-phosphate is removed by filtration and dried under reduced pressure at 100° C.

The 9α-fluoro-11β,16α,17α,21-tetrahydroxy-6-methyl-20-oxo-4,6-pregnadieno-[3,2-c]pyrazole-16α,17α - acetonide 21-phosphate is dissolved in 50 ml. of water containing one molar equivalent of sodium carbonate. The solution is then lyophilized. The resulting white powder is substantially pure disodium salt of 9α-fluoro-11β,16α,17α,21-tetrahydroxy-6-methyl-20-oxo-4,6 - pregnadieno - [3,2-c]pyrazole-16α,17α-acetonide 21-phosphate.

EXAMPLE 21

Preparation of 9α-fluoro-11β,16α,17α,21-tetrahydroxy-20-oxo-2'-(p-fluorophenyl) - 4,6-pregnadieno-[3,2-c]pyrazole-16α,17α-acetonide 21-phosphate and potassium salt 0.5 g. of 9α-fluoro-11β,16α,17α,21-tetrahydroxy-20-oxo-2'(p-fluorophenyl-4,6-pregnadieno - [3,2-c]pyrazole - 16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 9α-fluoro-11β,16α,17α,21-tetrahydroxy-20-oxo-2' - (p-fluorophenyl) - 4,6 - pregnadieno-[3,2-c]pyrazole-16α,17α-acetonide 21-phosphate is removed by filtration and dried under reduced pressure at 100° C.

The 9α-fluoro-11β,16α,17α,21 - tetrahydroxy-20-oxo-2'-(p-fluorophenyl)-4,6-pregnadieno - [3,2-c]pyrazole - 16α,17α-acetonide 21-phosphate is dissolved in 50 ml. of water containing two molecular equivalents of potassium hydroxide. The solution is then lyophilized. The resulting white powder is substantially pure dipotassium salt of 9α-fluoro - 11β,16α,17α,21 - tetrahydroxy - 20 - oxo - 2' - (p-fluorophenyl) - 4,6 - pregnadieno - [3,2-c]pyrazole - 16α,17α-acetonide 21-phosphate.

EXAMPLE 22

Preparation of 6-fluoro - 16α,17α,21 - trihydroxy - 11,20-dioxo - 4,6 - pregnadieno - [3,2-c]pyrazole - 16α,17α-acetonide 21-phosphate and potassium salt 0.5 g. of 6-fluoro-16α,17α,21-trihydroxy - 11,20-dioxo-4,6-pregnadieno-[3,2-c]pyrazole - 16α,17α - acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 6-fluoro-16α,17α,21-trihydroxy-11,20 - dioxo-4,6-pregnadieno - [3,2-c]pyrazole - 16α,17α-acetonide 21-phosphate is removed by filtration and dried under reduced pressure at 100° C.

The 6 - fluoro - 16α,17α,21 - trihydroxy - 11,20 - dioxo-4,6 - pregnadieno[3,2-c]pyrazole - 16α,17α-acetonide 21-phosphate is dissolved in 50 ml. of water containing two molecular equivalents of potassium hydroxide. The solution is then lyophilized. The resulting white powder is substantially pure dipotassium salt of 6-fluoro-16α,17α,21-trihydroxy - 11,20-dioxo - 4,6 - pregnadieno[3,2-c]pyrazole-16α,17α-acetonide 21-phosphate.

EXAMPLE 23

Preparation of 16α,17α,21 - trihydroxy - 6 - methyl - 11, 20 - dioxo - 2' - phenyl - 4,6 - pregnadieno - [3,2-c] pyrazole-16α,17α-acetonide 21-phosphate and potassium salt 0.5 g. of 16α,17α,21-trihydroxy-6-methyl-11,20-dioxo-2'-phenyl - 4,6 - pregnadieno - [3,2-c[pyrazole - 16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 16α,17α,21-trihydoxy-6-methyl-11,20-dioxo-2'-phenyl-4,6-pregnadieno-[3,2-c]pyrazole-16α,17α-acetonide 21-phosphate is removed by filtration and dried under reduced pressure at 100° C.

The 16α,17α,21-trihydroxy-6-methyl-11,20-dioxo-2'-phenyl-4,6-pregnadieno-[3,2-c]pyrazole-16α,17α-acetonide 21-phosphate is dissolved in 50 ml. of water containing two molecular equivalents of potassium hydroxide. The solution is then lyophilized. The resulting white powder is substantially pure dipotassium salt of 16α,17α,21-trihydroxy-6-methyl-11,20-dioxo-2'-phenyl-4,6-pregnadieno-[3,2-c]pyrazole-16α,17α-acetonide.

EXAMPLE 24

Preparation of 16α,17α,21-trihydroxy-11,20-dioxo-4,6-pregnadieno[3,2-c]pyrazole-16α,17α-acetonide 21-phosphate and potassium salt 0.5 g. of 16α,17α,21-trihydroxy-11,20-dioxo-4,6-pregnadieno[3,2-c]pyrazole-16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 16α,17α,21-trihydroxy-11,20-dioxo-4,6-pregnadieno[3,2-c]pyrazole-16α,17α-acetonide 21-phosphate is removed by filtration and dried under reduced pressure at 100° C.

The 16α,17α,21-trihydroxy-11,20-dioxo-4,6-pregnadieno[3,2-c]pyrazole-16α,17α-acetonide 21-phosphate is dissolved in 50 ml. of water containing two molecular equivalents of potassium hydroxide. The solution is then lyophilized. The resulting white powder is substantially pure dipotassium salt of 16α,17α,21-trihydroxy-11,20-dioxo-4,6-pregnadieno[3,2-c]pyrazole-16α,17α-acetonide 21-phosphate.

EXAMPLE 25

Preparation of 16α,17α,21-trihydroxy-11,20-dioxo-4-pregneno-[3,2-c]pyrazole-16α,17α-acetonide 21-phosphate and potassium salt 0.5 g. of 16α,17α,21-trihydroxy-11,20-dioxo-4-pregneno-[3,2-c]pyrazole-16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 16α,17α,21-trihydroxy-11,20-dioxo-4-pregneno-[3,2-c]pyrazole-16α,17α-acetonide 21-phosphate is removed by filtration and dried under reduced pressure at 100° C.

The 16α,17α,21-trihydroxy-11,20-dioxo-4-pregneno-[3,2-c]pyrazole-16α,17α-acetonide 21-phosphate is dissolved in 50 ml. of water containing two molecular equivalents of potassium hydroxide. The solution is then lyophilized. The resulting white powder is substantially pure dipotassium salt of 16α,17α,21-trihydroxy-11,20-dioxo-4-pregneno-[3,2-c]pyrazole-16α,17α-acetonide 21-phosphate.

EXAMPLE 26

Preparation of triamcinolone 21-phosphate and potassium salt 0.5 g. of triamcinolone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml. portions of chloroform. The chloroform extracts are combined and the chloroform is removed by distillation under reduced pressure. The residue is triamcinolone 21-phosphate in substantially pure form.

The triamcinolone 21-phosphate is dissolved in 50 ml. of water containing two molecular equivalents of potassium hydroxide. The solution is then lyophilized. The resulting white powder is substantially pure dipotassium salt of triamcinolone 21-phosphate.

EXAMPLE 27

Preparation of desoxycorticosterone 21-phosphate and potassium salt 0.5 g. of desoxycorticosterone is added with stirring to 3.0 ml. of pyrophosphoryl chloride which is protected from moisture and maintained at 0° C. during addition and for twenty minutes after addition is complete. The reaction mixture is then a clear solution and is slowly added to 100 ml. of vigorously stirred water which is at a temperature of 0° C. The temperature of the mixture is allowed to come to room temperature and extracted three times with 100 ml. portions of chloroform. The chloroform extracts are combined and the chloroform is removed by distillation under reduced pressure. The residue is desoxycorticosterone 21-phosphate in substantially pure form.

The desoxycorticosterone 21-phosphate is dissolved in 50 ml. of water containing two molecular equivalents of potassium hydroxide. The solution is then lyophilized. The resulting white powder is substantially pure dipotassium salt of desoxycorticosterone 21-phosphate.

EXAMPLE 28

Preparation of 3,20-diketo-16α,17α,21-trihydroxy-4-pregnene-16α,17α-acetonide 21-phosphate and sodium salt 0.5 g. of 3,20-diketo-16α,17α,21-trihydroxy-4-pregnene-16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 3,20-diketo-16α,17α,21-trihydroxy-4-pregnene-16α,17α-acetonide 21-phosphate is removed by filtration and dried under reduced pressure at 100° C.

The 3,20-diketo-16α,17α,21-trihydroxy-4-pregnene-16α,17α-acetonide 21-phosphate is dissolved in 50 ml. of water containing one molar equivalent of sodium carbonate. The solution is then lyophilized. The resulting white powder is substantially pure disodium salt of 3,20-diketo-16α,17α,21-trihydroxy-4-pregnene-16α,17α-acetonide 21-phosphate.

EXAMPLE 29

Preparation of 9α-fluoro-11β,16α,17α,21-tetrahydroxy-20-oxo-2'-(para-fluorophenyl)-4-pregnene-[3,2-c]pyrazole-16α,17α-acetonide 21-phosphate and sodium salt 0.5 g. of 9α-fluoro-11β,16α,17α,21-tetrahydroxy-20-oxo-2'-(para-fluorophenyl)-4-pregnene-[3,2-c]pyrazole-16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 9α-fluoro-11β,16α,17α,21-tetrahydroxy-20-oxo-2'-(para-fluorophenyl)-4-pregnene-[3,2-c]pyrazole-16α,17α-acetonide 21-phosphate is removed by filtration and dried under reduced pressure at 100° C.

The 9α - fluoro - 11β,16α,17α,21 - tetrahydroxy - 20-oxo - 2' - (para-fluorophenyl) - 4 - pregnene - [3,2-c]pyrazole-16,17α-acetonide 21-phosphate is dissolved in 50 ml. of water containing one molar equivalent of sodium carbonate. The solution is then lyophilized. The resulting white powder is substantially pure disodium salt of 9α-fluoro - 11β,16α,17α,21 - tetrahydroxy - 20 - oxo - 2'-(para - fluorophenyl) - 4 - pregnene - [3,2-c]pyrazole-16α,17α-acetonide 21-phosphate.

EXAMPLE 30

Preparation of 16α,17α,21 - trihydroxy - 20 - oxo - 2'-(para - fluorophenyl) - 4 - pregnene - [3,2-c]pyrazole-16α,17α-acetonide 21-phosphate and sodium salt 0.5 g. of 16α,17α,21-trihydroxy-20-oxo-2'-(para-fluorophenyl) - 4 - pregnene - [3,2-c]pyrazole - 16α,17α-acetonide is added with stirring to 3.0 ml. of pyrophosphoryl chloride which is protected from moisture. The reaction mixture is stirred and maintained at 0° C. during the addition and for thirty minutes after addition is complete and is then poured slowly into 150 ml. of vigorously stirred ice-cold water. Stirring is continued for one hour and the temperature is allowed to rise to room temperature. The precipitate of 16α,17α,21-trihydroxy-20-oxo-2'-(para - fluorophenyl) - 4 - pregnene - [3,2-c]pyrazole-16α,17α-acetonide 21-phosphate is removed by filtration and dried under reduced pressure at 100° C.

The 16α,17α,21 - trihydroxy - 20 - oxo - 2' - (para-fluorophenyl) - 4 - pregnene - [3,2-c]pyrazole - 16α,17α-acetonide 21-phosphate is dissolved in 50 ml. of water containing one molar equivalent of sodium carbonate. The solution is then lyophilized. The resulting white powder is substantially pure disodium salt of 16α,17α,21-trihydroxy - 20 - oxo - 2' - (para - fluorophenyl) - 4 - pregnene-[3,2-c]pyrazole-16α,17α-acetonide 21-phosphate.

Various changes and modifications may be made in carrying out the present invention without departing from the spirit and scope thereof. Insofar as these changes and modifications are within the purview of the annexed claims, they are to be considered as part of the invention.

What is claimed is:

1. The process for preparing a 21-hydroxy-steroid 21-phosphate of the pregnane series which comprises reacting pyrophosphoryl chloride with the corresponding 21-hydroxy-steroid to produce the 21-dichlorophosphate of said 21-hydroxy-steroid, and reacting said 21-hydroxy-steroid 21-dichlorophosphate with water.

2. The process as defined in claim 1, in which the starting material is an 11,21-dihydroxy-pregnane steroid, and the product obtained is the corresponding 11,21-dihydroxy-pregnane steroid 21-phosphate.

3. The process as defined in claim 1, in which the starting material is an 11,21-dihydroxy-pregnane steroid having halogen or lower alkyl in the 9-position, and the product is the corresponding 9-(halo or alkyl)-11,21-dihydroxy-pregnane steroid 21-phosphate.

4. The process as defined in claim 1, in which the starting material is a 16,17,21-trihydroxy-pregnane steroid 16,17-acetonide, and the product obtained is the corresponding 16,17,21-trihydroxy-pregnane steroid 16,17-acetonide 21-phosphate.

5. The process as defined in claim 1, in which the 21-hydroxy-steroid 21-phosphate product is reacted with an alkali metal hydroxide or alkali metal carbonate to produce the corresponding alkali metal salt of said 21-hydroxy-steroid 21-phosphate.

6. The process for preparing 9α-fluoro-11β,16α,17α,21-tetrahydroxy - 20 - oxo - 2' - (para - fluorophenyl) - 4-pregnane - [3,2-c]pyrazole - 16α,17α - acetonide 21-phosphate which comprises reacting pyrophosphoryl chloride with 9α - fluoro - 11β,16α,17α,21 - tetrahydroxy - 20 - oxo-2' - (para - fluorophenyl) - 4 - pregnene - [3,2-c]pyrazole-16α,17α-acetonide to produce 9α-fluoro-11β,16α,17α,21-tetrahydroxy - 20 - oxo - 2' - (para - fluorophenyl) - 4-pregnene - [3,2-c]pyrazole - 16α,17α - acetonide 21-dichlorophosphate, and reacting said 9α-fluoro-11β,16α,17α, 21 - tetrahydroxy - 20 - oxo - 2' - (para - fluorophenyl)-4 - pregnene - [3,2-c]pyrazole - 16α,17α - acetonide 21-dichlorophosphate with water.

7. The process for preparing alkali metal salts of 9α-fluoro - 11β,16α,17α,21 - tetrahydroxy - 20 - oxo - 2'-(parafluorophenyl) - 4 - pregnene - [3,2-c]pyrazole - 16α,17α-acetonide 21-phosphate which comprises reacting pyrophosphoryl chloride with 9α-fluoro-11β,16α,17α,21-tetrahydroxy - 20 - oxo - 2' - (para - fluorophenyl) - 4 - pregnene - [3,2-c]pyrazole - 16α,17α - acetonide to produce 9α - fluoro - 11β,16α,17α,21 - tetrahydroxy - 20 - oxo 2'-(para - fluorophenyl) - 4 - pregnene - [3,2-c]pyrazole-16α,17α-acetonide 21-dichlorophosphate, reacting the latter compound with water to form 9α-fluoro-11β,16α,17α, 21 - tetrahydroxy - 20 - oxo - 2' - (para - fluorophenyl)-4 - pregnene - [3,2-c]pyrazole - 16α,17α - acetonide 21-phosphate, and reacting the last-named compound with an alkali metal hydroxide or alkali metal carbonate.

References Cited

UNITED STATES PATENTS 3,053,349   9/1962   Fried _____ 260—239.55

FOREIGN PATENTS 1,119,278   12/1961   Germany.

OTHER REFERENCES

Loewenthal, H.: Tetrahedron, 6, 1959, pp. 269–303, p. 300 relied on.

LEWIS GOTTS, Primary Examiner

E. G. LOVE, Assistant Examiner

U.S. Cl. X.R.

260—397.45, 397.47, 999